Dec. 27, 1955    J. YOUNG ET AL    2,728,670
POROUS CONTAINER OF A DRY INFUSION
COMMODITY AND COVER COMBINATION
Filed May 4, 1954
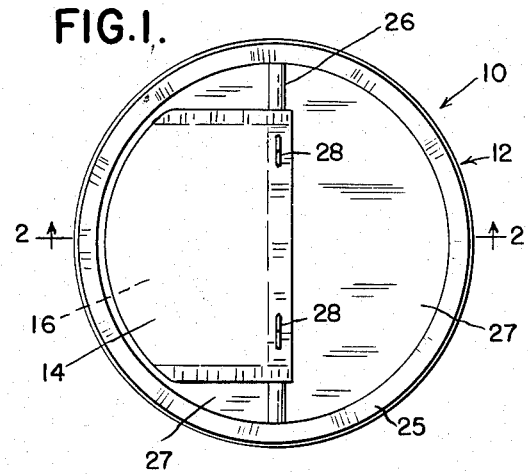
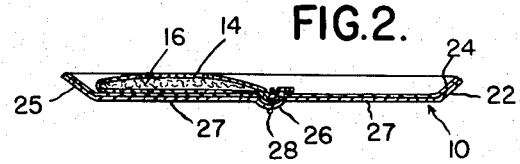
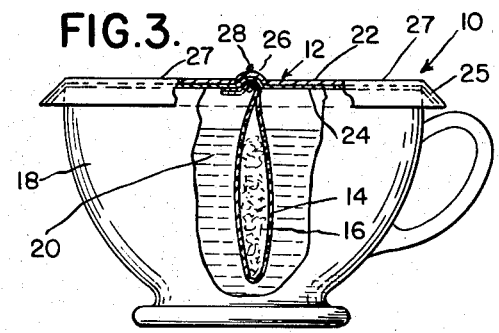
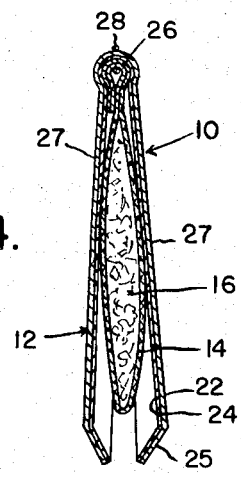
INVENTORS
JULIUS YOUNG
BY BENJAMIN W. COLMAN
Benjamin W. Colman
ATTORNEYS

United States Patent Office 2,728,670
Patented Dec. 27, 1955

2,728,670

POROUS CONTAINER OF A DRY INFUSION COMMODITY AND COVER COMBINATION

Julius Young, Detroit, and Benjamin W. Colman, Berkley, Mich., assignors to Pakko Laboratories, Inc., Detroit, Mich., a corporation of Michigan Application May 4, 1954, Serial No. 427,451

7 Claims. (Cl. 99—77.1)

This invention relates to a cover and bag combination, in which said bag is made of a porous material such as paper and contains a dry infusion commodity such as tea or coffee, and more particularly to a combination of the cover and bag which provides for covering a cup of boiling or hot water into which the bag, directly suspended from the cover, is immersed.

Up to the present time, the use of dry infusion commodities in porous containers, such as tea bags and coffee bags, has presented several problems. Among these are the difficulty of anchoring a tea bag, for example, positively to a cup of hot water so as to avoid having to fish it out with a spoon or the fingers. Oftentimes, the tag and string go into the cup along with the bag, making for a messy disposal problem. Again, there is the problem of keeping the tea hot during the steeping operation. Because tannin is extracted more readily at elevated temperatures, as the temperature goes down in an uncovered cup, the extraction rate decreases sharply. To more completely extract the tannin, squeezing of the bag is strongly recommended. There has, heretofore, been no easy or simple way of doing this, without considerable messiness and dripping. And finally, the problem of what to do with a wet soaking tea bag, how to dispose of it without dripping on a table cloth or dirtying extra dishes or littering up the saucer along the cup of tea, has certainly been present.

Some efforts in the past have been directed toward a solution of one or the other of these many problems. However, the inventive construction here disclosed, for the first time, solves all of them in an extremely easy, simple and economical manner by the use of a single component, inventively arranged in the construction.

The invention comprises a device in which a dry infusion commodity, such as tea or coffee, is contained in a porous bag or pouch of paper which is directly secured to a cup cover having a heat reflective surface on the side to which the bag is secured. A fold line is provided across the cover, preferably through its center, and the bag is secured substantially along this line. To assist in positioning the cover on a cup, a peripheral annular flange is formed about the cover so that it depends over the edge of the cup.

The construction has for an object the provision of a heat containing cover for a cup filled with hot or boiling water.

Another object is to provide a construction in which a porous bag of a dry infusion commodity is suspended directly from a cup cover, so that the bag is not "lost" in the cup of hot water.

A further object is to provide a cup cover that is a receptacle for the bag of water infused material, after use in making a beverage.

Still another object is to provide a cup cover so arranged that it will fold about the bag of water infused material after use, for squeezing the bag substantially free of water.

Another object is to provide a cup cover that will receive the water expressed bag for deposit therewithin, without adjustment or modification of the construction.

Additional objects will become apparent from the description of the invention given below. Reference may be had to the appended drawing, forming an integral part hereof, and in which Fig. 1 is a bottom plan view of the inventive construction.

Fig. 2 is a vertical sectional view on the line 2—2 of Fig. 1.

Fig. 3 is a vertical sectional view of the construction in use in a cup of water.

Fig. 4 is a vertical sectional view showing the compressed cover and bag combination.

The inventive construction, as described below and shown in the drawing, is a cover and bag combination 10 comprising a paper and aluminum foil laminated cup cover 12, and a porous bag 14 of a dry infusion commodity 16 designed for immersion in a cup 18 of water 20.

The cup cover 12 is preferably made of a layer of suitable paper 22 laminated or coated with a heat reflective material such as aluminum foil 24. The cover 12 is arranged with an annular peripheral flange 25 formed thereon. A diametric fold line 26 is impressed or otherwise formed in the cover, along which line the cover 12 is designed to be folded upon the bag 14 secured and suspended therebelow. The fold line 26 divides the cover into sides 27, 27. Bag 14, which is made of a porous material such as paper, is secured by staples 28 or a suitable adhesive to the foil side of cover 12, along fold line 26.

The dry infusion commodity 16 is tea, coffee, flavored sugars or similar materials designed for making beverages or other liquid, solid or semi-solid potables.

In operation, as shown in Figs. 3 and 4, the cover and bag combination 10 is arranged over and in a cup 18 of hot or boiling water 20, with the cover foil side 24 directly over the water, the cover flange 25 extending over and slightly beyond the cup edge. In this position, the bag 14 is suspended from the cover 12 and is immersed in the water 20. The dry infusion commodity 16 is steeped in the water to create the beverage desired.

It will be apparent from the above that the combination 10 accomplishes several desirable functions and serves many purposes. The bag 14 cannot get "lost" in the cup but always remains readily available for removal from the water and cup without getting the fingers wet or stained. It avoids the messiness presently attendant upon the use of bags suspended by strings from label tags which often follow the bag into the water.

Secondly, the foil laminated cup cover 12 reflects the heat back into the cup at that portion which loses heat most rapidly. By the use of this construction, the bag is steeped in water maintained at a higher temperature for a longer period of time than is now present. This makes for better tea or coffee, as steeping at higher temperatures for periods of from 3–5 minutes is among the recommended directions of tea and coffee producers.

After the beverage is suffiiciently steeped by the bag 14, the cup cover 12 is lifted from the cup 18 and folded by the fingers along line 26 over the bag 14. The two cover sides 27 are then compressed upon the bag 14 squeezing the surplus liquid from the bag. This squeezing of the bag 14 is particularly directed by the tea producers, as it is claimed to produce a better beverage.

When the surplus liquid has been expressed from the bag 14, the combination 10 is then ready for deposition upon the table or other place. The folded cover member 12 is simply laid on one side 27, the flange 25 serving to retain whatever little liquid may find its way out of the bag 14. Thus, the cup cover 12 also serves the functions and purposes of compressing the bag 14, directly suspended from it and between the cover sides 27, as well as providing a suitable receptable for the moist bag, after use. All of this is done without once coming in direct contact with the bag 14, making for a more pleasurable use of a difficult and often messy product.

Of course, the cover member 12 need not be circular in arrangement, but may be of a shape suitable for the container of water that is used, such as a rectangular, square or oval pot or vessel.

It is to be understood that the details of the foregoing specification may be changed and varied in greater or lesser degree without departing from the essence of our invention.

We claim:

1. In a beverage infusion package, a cover member comprising a lamination of paper and aluminum foil, said member being designed to cover a vessel for beverage making and provided with a median line for folding said cover into two halves, a porous bag containing a beverage infusion commodity secured directly to the foil side of said cover member along said median line, whereby said halves may be brought together over said bag after infusion to express excess liquid from said bag.

2. In a beverage infusion package, a cover member comprising a lamination of paper and aluminum foil, said cover being arranged substantially uniplanar and designed to cover a vessel for beverage making and provided with a median line for folding said cover member into two portions, a porous bag containing a beverage infusion commodity secured directly to the foil side of said cover member along said median line, whereby said cover portions may be brought together over said bag after infusion to express excess liquid from said bag.

3. In a beverage infusion package, a substantially flat member to cover a vessel for beverage making comprising a lamination of paper and aluminum foil, said cover member being provided with a median line for folding said member into two portions, a porous bag containing a beverage infusion commodity secured directly to the foil side of said cover member along said median line so as to depend therefrom into said vessel, whereby after infusion of said bag said cover member portions may be brought together about said bag to express excess liquid therefrom.

4. In a beverage infusion package for use with a beverage making vessel, a cover member for said vessel comprising a lamination of paper and aluminum foil, said cover member being provided with a median line for folding said member into two side portions, a porous paper bag containing a beverage infusion commodity secured directly to the foil side of said cover member along said median line so as to depend therefrom into said vessel substantially through the center thereof, whereby said side portions may be brought together about said bag after infusion thereof to express excess liquid from said bag.

5. The method of brewing a beverage in a vessel of liquid comprising the steps of suspending a porous container of a beverage infusion commodity secured along a median fold line of a cover member overlying and covering said vessel in said liquid, said cover member being a lamination of paper and aluminum foil, allowing said commodity to brew a sufficient period of time in said liquid, removing said cover member from said vessel and said porous container from said liquid, and bringing said cover member down upon two sides of said porous container about said median fold line in compressing effect upon said container, expressing excess liquid from said container, and removing said moist container overfolded by said cover member from over said vessel.

6. The method of brewing a beverage in a vessel of liquid comprising the steps of suspending a porous container of a beverage infusion commodity secured along a median fold line of a member covering and resting upon said vessel in said liquid so that said container is substantially central in said vessel, said member being a lamination of paper and aluminum foil, allowing said commodity to brew in said liquid a sufficient period of time, removing said container from said liquid, and folding said cover member in two portions along said median line down about both sides of said container in compressing effect to express excess liquid from said container into said vessel.

7. The method of brewing a beverage in a vessel of liquid comprising the steps of pouring a substantial amount of liquid into said vessel, suspending a porous container of a beverage infusion commodity secured along a median fold line of a member covering said vessel in said liquid, said member being a lamination of paper and aluminum foil, allowing said commodity to brew in said liquid a sufficient period of time, removing said container from said liquid to a position above said vessel, folding said vessel covering member along said median line into two portions upon both sides of said container in compressing effect thereupon, and expressing excess liquid from said porous container into said vessel.

References Cited in the file of this patent

UNITED STATES PATENTS

| | | |
|---|---|---|
| 1,747,596 | Peal | Feb. 18, 1930 |
| 2,137,243 | Heyman | Nov. 22, 1938 |
| 2,192,605 | Salfisberg | Mar. 5, 1940 |
| 2,277,050 | Reed et al. | Mar. 24, 1942 |
| 2,606,836 | McCabe | Aug. 12, 1952 |
| 2,614,934 | Trotman | Oct. 21, 1952 |